United States Patent [19]

Neumann et al.

[11] Patent Number: 4,607,364
[45] Date of Patent: Aug. 19, 1986

[54] MULTIMODE DATA COMMUNICATION SYSTEM

[76] Inventors: Jeffrey Neumann, 27 Ralph St., Highlands, N.J. 07732; David W. Petr, 32 William St., Redbank, N.J. 07701; George W. Schramm, 273 Michael Ave., Oakhurst, N.J. 07755; John B. Sharp, 2345 Ash St., Denver, Colo. 80207

[21] Appl. No.: 549,739

[22] Filed: Nov. 8, 1983

[51] Int. Cl.⁴ .............................................. H04J 3/00
[52] U.S. Cl. ..................................... 370/99; 370/110.1
[58] Field of Search ................. 370/99, 110.1, 58, 84, 370/91; 375/121

[56] References Cited

U.S. PATENT DOCUMENTS

| | | | |
|---|---|---|---|
| 4,016,367 | 4/1977 | Law et al. | 370/99 |
| 4,229,815 | 10/1980 | Cummiskey | 370/84 |
| 4,258,433 | 3/1981 | Herschtal et al. | 370/84 |
| 4,309,765 | 1/1982 | Müeller et al. | 370/99 |
| 4,367,549 | 1/1983 | Vachee | 370/91 |
| 4,390,986 | 6/1983 | Moses | 370/89 |
| 4,479,142 | 10/1984 | Buschman et al. | 370/99 |
| 4,484,323 | 11/1984 | Beuscher et al. | 370/58 |
| 4,484,324 | 11/1984 | Orsic | 370/58 |
| 4,488,294 | 12/1984 | Christensen | 370/110.1 |
| 4,495,614 | 1/1985 | Aro et al. | 370/58 |

OTHER PUBLICATIONS

"Frame-Mode Customer Access to Local Integrated Voice and Data Digital Networks", *IEEE 1979 International Conference on Communications*, Accarino et al., Jul. 1979, pp. 38.5/1-7.

Primary Examiner—Douglas W. Olms
Assistant Examiner—Kenneth I. Rokoff

[57] ABSTRACT

A data transmission system that can controllably transmit data in three different modes between connected data devices. The first mode transmits data at a 64 Kbps rate. The second mode transmits data at a 56 Kbps rate plus control signals at an 8 Kbps rate. The third mode transmits data and control messages at a rate of up to 50 Kbps between connected terminals or other data devices. For all modes, the data is transmitted by inserting it one byte at a time into an information field of successive ones of cyclically reoccurring time multiplexed frames.

47 Claims, 9 Drawing Figures

DCP MODE 2: DATA AND CONTROL COMMUNICATION TO 50 Kbps

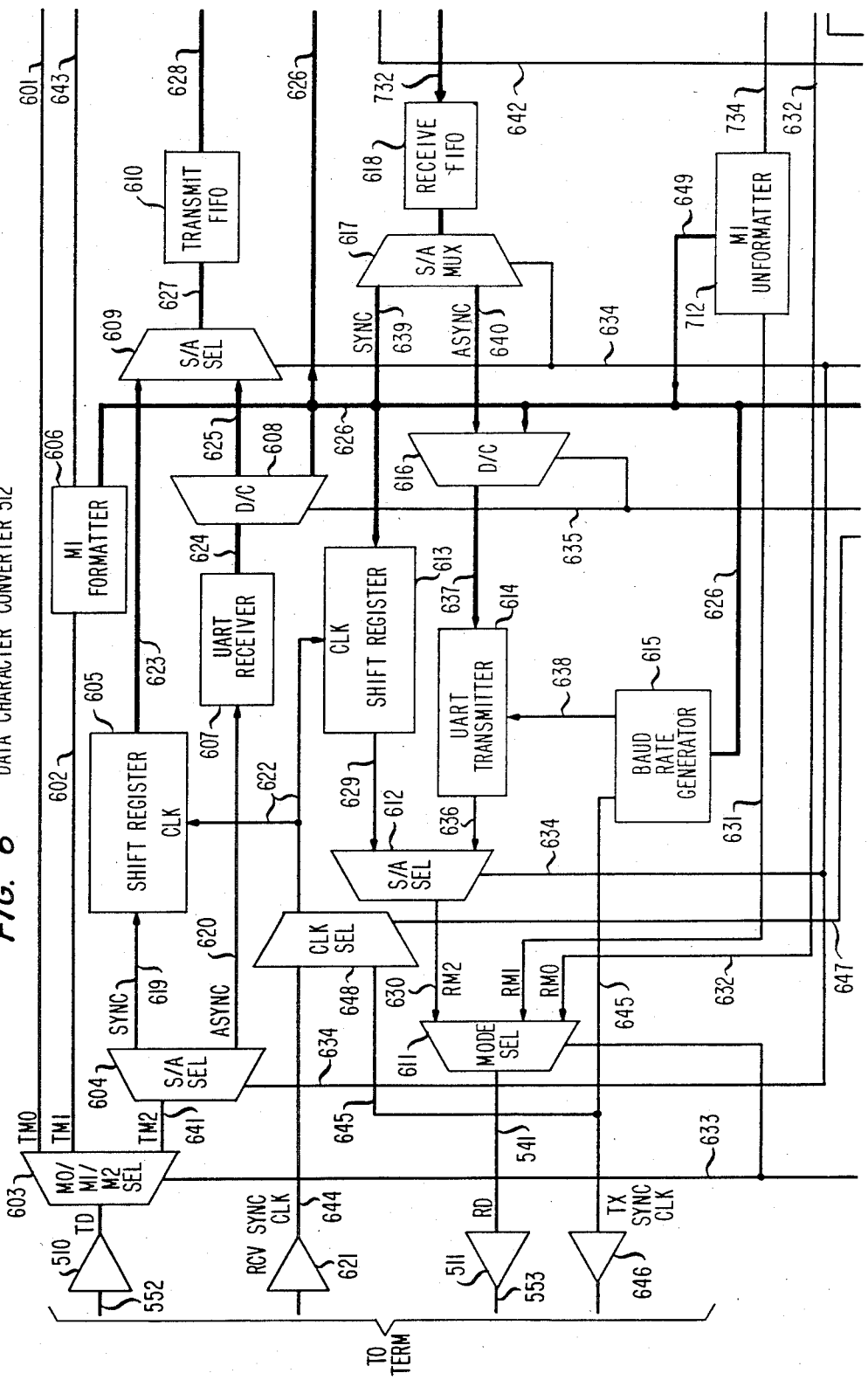
FIG. 6 DATA CHARACTER CONVERTER 512

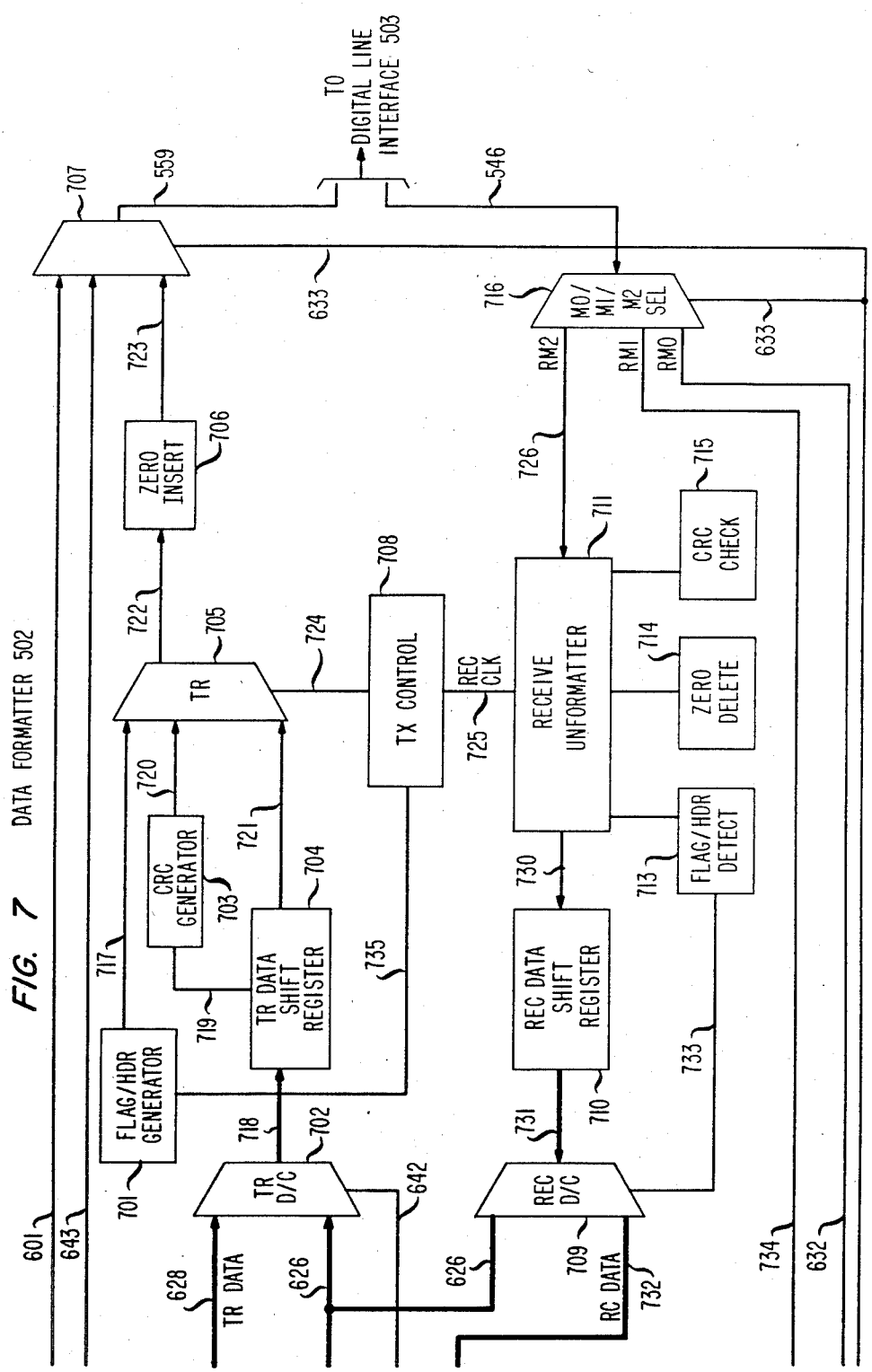
FIG. 7 DATA FORMATTER 502

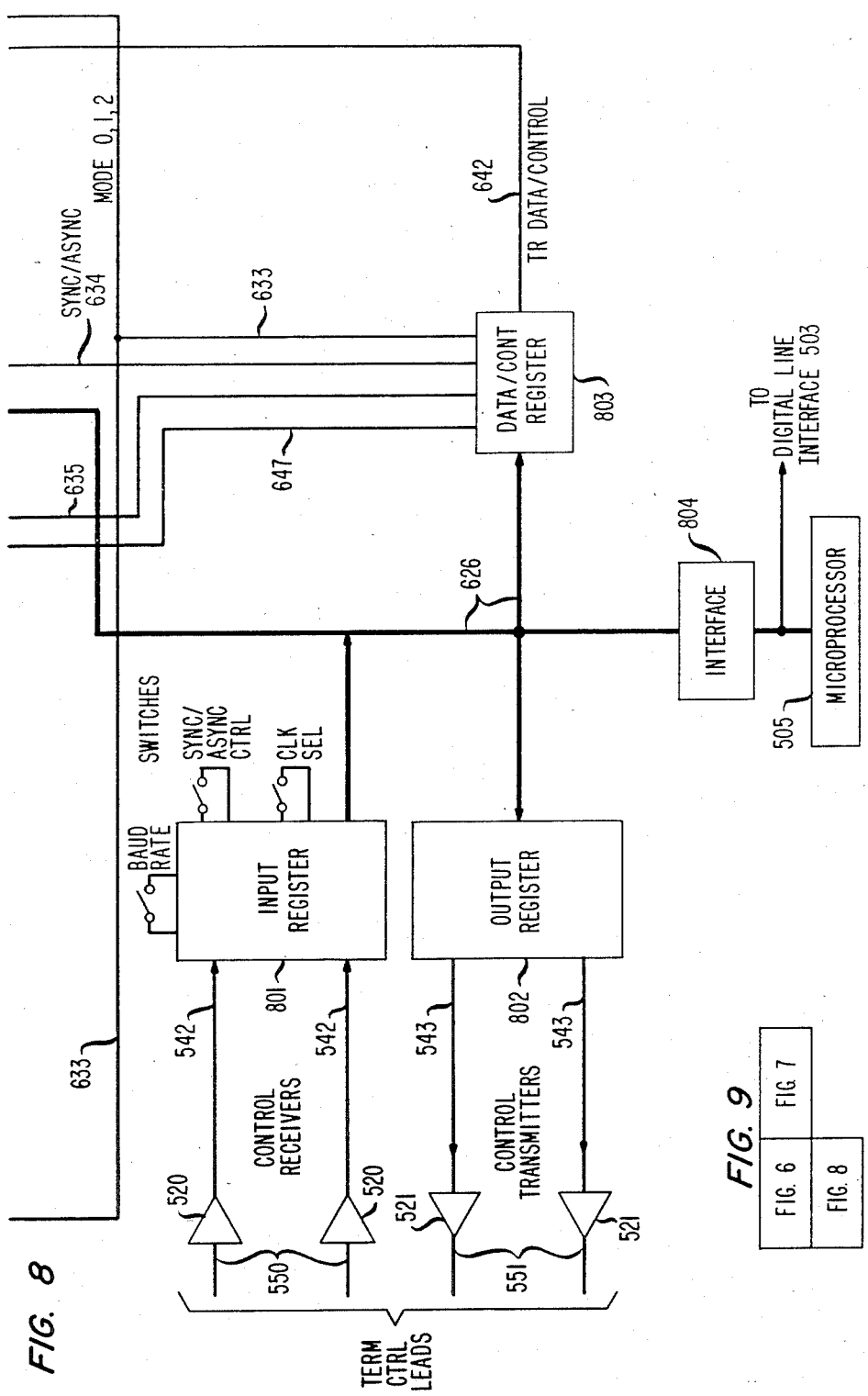

MULTIMODE DATA COMMUNICATION SYSTEM

CROSS-REFERENCE TO RELATED APPLICATIONS

This application is related to the following copending applications:

G. N. Squicciarini, Ser. No. 514,882, filed July 18, 1983, now U.S. Pat. No. 4,535,198, dated Aug. 13, 1985, and S. R. Peck et al, Ser. No. 539,813, filed Oct. 7, 1983 now U.S. Pat. No. 4,534,023, dated Aug. 6, 1985.

TECHNICAL FIELD

This invention relates to a data communication system and in particular to a system for serving data terminals having a variety of different types of interfaces.

BACKGROUND OF THE INVENTION

Present day customer premise data communication systems must be capable of providing service for work stations having diverse types of terminal equipments and differing service needs. These systems must, for example, serve work stations having digital telephones, analog telephones, and various types of data terminal equipment. The data terminal equipment can operate with a variety of interfaces, transmission rates, and transmission protocols. Interconnection must be provided between these various data terminal types and host computers or transmission facilities when they are interconnected by communication switching facilities.

In prior art arrangements, a switching system could provide both voice and/or data service only by the provision of customized equipment preselected for each type of device. The phone service was customarily provided by a dedicated tip and ring analog pair. The data service was provided by the use of a second tip and ring pair together with an appropriate modem for digital to analog conversion.

Data terminals operate at different transmission rates and formats as determined by the needs of each customer and the characteristics of the available communication channels. When only analog channels are available, the types of modems available fell into two general classes—asynchronous or synchronous.

Asynchronous modems support data transmission at relatively low rates (generally ≦1200 bits per second). Asynchronous data transmission is characterized by character by character operation with each character framed by start and stop bits. The asynchronous modem, while not providing particularly high transmission rates, is inexpensive to implement and the individual character framing allows simple terminal interface protocols.

Synchronous data transmission is characterized by a continuous data stream together with a bit synchronized clock. Synchronous modems take advantage of the bit to bit coherence of the transmitted data stream to operate at relatively higher rates (generally ≦9600 bits per second). Since there is no character framing inherent in the synchronous data transmission strategy, mechanisms have been developed to frame blocks of characters and provide data transparency. Transparency means that the transmitted data patterns are not constrained by the communication strategy. These framing mechanisms, together with strategies for error and flow control, link initialization, etc., make up what are generally known as link level protocols. Many have been developed by different terminal or computer manufacturers or standards bodies (e.g. HDLC, BISYNC, DDCMP).

These synchronous protocols are generally much more complex and therefore more expensive to support than the simple asynchronous protocols. The principal advantages in using synchronous transmission are higher transmission rates and better performance (e.g. lower error rates). Synchronous modems are transparent to the particular protocol being used. They transmit the synchronous bit stream without knowing any details of the protocol. Because they operate at higher rates, synchronous modems are generally more expensive than asynchronous modems.

In addition to modems and terminal equipment being classed as either synchronous or asynchronous, they can be classed as either half- or full-duplex. Half-duplex operation involves transmission in one direction at a time from device A to device B; then the communication line is "turned around" for transmission from device B to device A. This allows better utilization of the channel bandwidth for communication in one direction at a time.

Full-duplex operation allows both devices on the communication link to transmit to the other simultaneously. For analog channels, full-duplex generally reduces the bit rate in each direction.

In order to control analog modems, interface standards such as RS232C evolved. This standard of the Electronic Industries Association, as well as others, provides a multiwire (25 lead) interface definition between data terminal equipment and modems. Interface leads were defined for data and timing, as well as multiple control leads to control the state of the modem and the direction of transmission (for half-duplex modems). The state on one modem is often transferred indirectly to the modem at the other end of the connection to affect the state of the other modem. For example, a Request-to-Send control lead from a terminal to a half-duplex modem causes the modem to begin sending a carrier signal to the receiving modem. The receiving modem, upon detection of the carrier, will set its Carrier Detect control lead true. An analog modem pair, therefore, transmits data, timing, and control information between two pieces of data equipment (terminals or computers).

In summary, the present day data communication environment contains different types of data terminal equipment using a variety of transmission rates, formats, protocols, and control strategies. Thus, even though present day switching systems can be equipped to serve stations having phones and/or terminals, the provision of this service requires customized equipment at each station to serve the specific characteristics of that equipment and the communication channels available.

It is therefore a problem for present day communication switching systems to provide voice plus data service with the use of universal station interface equipment that is ubiquitously adapted to serve a wide spectrum of station equipments.

SUMMARY OF THE INVENTION

The present invention overcomes the disadvantages of the prior art by providing a digital transmission mechanism to and through a switching system that can provide voice plus data service for a wide range of terminals with the use of standardized station interface equipment. This interface equipment need not be customized in advance for the specific combinations of equipments at each station since it can serve different types of terminals having different protocols and different transmission rates. In addition, it extends the range of transmission rates available to the terminal or computer equipment being used.

The invention uses two pairs of conductors (one pair in each direction) to interconnect each station with associated ports of the switching system. Information including voice information, data, and control signals is exchanged between the stations and the switching system by the use of time multiplexed cyclically reoccurring frames in what is termed the Digital Communication Protocol (DCP). Each DCP frame has an Information (I) field for each different device at a station plus a Signalling (S) field and a Framing (F) field. The signalling field is used for exchanging control messages between the station and the switching system control complex. Examples of such messages are to signal station on-hook/off-hook, dialing, lamp and push button control, and control of alphanumeric displays on the station.

The I fields are used to exchange information between the switching system and the phones and/or terminals of a station on each call involving the station. On a given call connection, the I field information is sent from a transmitting station, over associated conductor pairs to an associated port of the switching system, through the switch of the system, to the port serving the other station on the call. The I field information is further extended over associated conductor pairs to the other station. In the exemplary disclosed embodiment, I field information comprises 8 bit fields transmitted at a repetition rate of 8000 times a second for a bit transmission rate of 64 Kbits per second.

The disclosed system can serve call connections between various types of equipment. The use of the I field of the DCP frame differs depending upon the equipment connected on each call. For voice or bulk data transmission, the I field is used in what is termed Mode 0. In this mode, 64 Kbps of digitized voice or data can be exchanged between the two stations connected on a call. Transmission is restricted to synchronous, full-duplex operation. Digitized PCM voice is carried in this mode.

The I field can also be used for what is termed Mode 1 in which data is transmitted at a 56 Kbps rate. Data is restricted to full-duplex synchronous transmission and is identical to the format used in the Bell System DDS network.

In Mode 1, each byte in an I field frame is divided into two fields. These are a 7 bit field and a 1 bit field. The 7 bit field contains either customer data or a control state code, depending on the state of the 1 bit field. If the single bit field is a "1", the 7 bit field is customer data. If a "0", the 7 bit field is control information transmitted between the endpoints in the connection.

The I field can also be used in what is termed Mode 2. For this mode the I field serves data equipment, such as a terminal, at each end of the connection by providing for the transport of data or control information between them. The maximum data rates in each direction is limited to approximately 50 Kbps. In this mode, the equipment interfacing the data equipment at each end exchanges data or control messages via the same block delineation strategy as employed in HDLC. That is, data or control messages are transmitted as frames of variable length which are delineated by a special bit pattern (01111110) known as a flag. In the absence of data or control information to be sent, the interfacing equipment sends consecutive flags. The ability to transmit data or control messages containing the same bit pattern as a flag is preserved by the zero insertion/deletion mechanism defined in HDLC.

The terminal interfacing equipment at each station, for Mode 2, generates a continuous stream of flags on the DCP I field when no data or control information is being generated by a terminal. When data information or a control state change is generated by the data terminal equipment, the presence of the generated information is recognized by the interfacing equipment and is formed into a DCP Mode 2 message frame that includes a header field, data or control field, and an error checking field.

The header field is 8 bits long and contains one bit (D/C) which determines whether the message is transporting data or control information. If the D/C bit equals "1", the message is carrying customer data. If a "0", the message is carrying "end-to-end" signalling or control information.

The data or control field contains the customer data or "end-to-end" signalling information. This field is variable length.

The error checking field is a 16 bit long Cyclic Redundancy Check (CRC) sequence as defined in the HDLC standard. It is used to verify the accurate transmission of the data or control message.

The generated data or control message to be transmitted is processed and subdivided into 8 bit bytes. Each byte is inserted into the I field of a transmitted DCP frame. In this manner, a data or control message is transmitted to the interfacing equipment serving the other terminal involved on the call connection by inserting the plurality of 8 bit bytes comprising the message into the I field of successively generated DCP frames.

A DCP Mode 2 data message may contain either asynchronous or synchronous data to be transported between the interconnected data terminal equipment. Asynchronous data from a sending data device is received by the interfacing hardware where the start and stop bits are removed from each character. One or more such characters are put into the data field of the DCP Mode 2 frame before transmission across the switching system to the receiving interface equipment. The receiving interface equipment receives the Mode 2 frame, removes the data characters, and reinserts the start-stop bits for asynchronous transmission to the receiving data equipment.

Synchronous data from a data device is put into the data field of the Mode 2 frame transparently. The interfacing hardware receives bits at a rate determined by the clock signal at the interface to the data device. The interfacing hardware simply puts several consecutive bits into the data field and transmits them as a Mode 2 data message. While this message is being transmitted, the next several bits are being stored. They are transmitted in the subsequent data message.

The receiving interface equipment applies the consecutively received data bits to the receiving data equipment at the rate determined by a clock associated with the interface between the interfacing hardware and the data device.

The present invention, using DCP Mode 2, also provides a robust terminal control lead signalling function across the switch connection that enables the connected data terminal equipments to exchange control signals. This "end-to-end" signalling function simulates the capabilities of an analog modem to control the state of the modem at the other end of the connection as described previously. It goes farther than that however. The "end-to-end" signalling mechanism allows the complete state of the RS232C control leads from one terminal device to be transferred to the equipment at the other side of the connection. This capability allows the operation of equipment geographically separated and connected through a switching system to appear as though they are directly connected.

This capability is accomplished by the provision of interfacing equipment that scans control conductors of a piece of data terminal equipment cyclically to detect any changes of state of each control conductor. The detection of each change of state generates an appropriate control message which is inserted into the I field, after as a Mode 2 control message, byte by byte, and transmitted to interfacing equipment connected to the other data terminal equipment. Each Mode 2 control message is unique to a unique combination of control conductor potentials. When the control message containing the new RS232C control lead state is received by the interfacing equipment at the receiving end, the new state is applied to the RS232C interface connected to the associated data equipment. A change in control lead state on one side of the connection is therefore applied to the RS232C interface at the other side of the connection.

In summary, an information transport mechanism provided in accordance with this invention accommodates terminals operating with synchronous data or asynchronous data, as well as different baud rates and protocols. The associated interface equipment is flexible in its operation and eliminates the need for different interface equipment for each type of data equipment, transmission rate, or format. A data terminal user need only set-up the interfacing equipment to the transmission parameters needed—baud rate, synchronous/asynchronous, etc. In addition, the interfacing equipment and transport mechanisms extend the data rates available beyond what is presently available in analog baud switching systems.

The system of the present invention is transparent to the terminal data. In other words, the connected terminals may generate synchronous/asynchronous data with any protocol for communication with one another without the equipment of the present invention being concerned. Data or control information generated by a terminal or data device is collected by the interfacing equipment described in this invention and reformatted into one of the three modes depending on the bit rate of the data—Mode 0 for 64 Kbps; Mode 1 for 56 Kbps; and Mode 2 for 50 Kbps or less. This reformatted data or control information is transmitted through the system to the interface equipment at the other end of the switch connection. The interfacing equipment at this end unformats the data or control and presents it to its associated data equipment appropriately.

BRIEF DESCRIPTION OF THE DRAWINGS

This invention may be better understood by a reading of the following detailed description of one possible exemplary embodiment with reference to the accompanying drawings wherein:

FIGS. 6, 7, and 8 illustrate details of the data character 512 converter and the data formatter 502;
and
FIG. 9 illustrates the manner in which FIGS. 6, 7, and 8 should be arranged.

DETAILED DESCRIPTION

Figure 1:
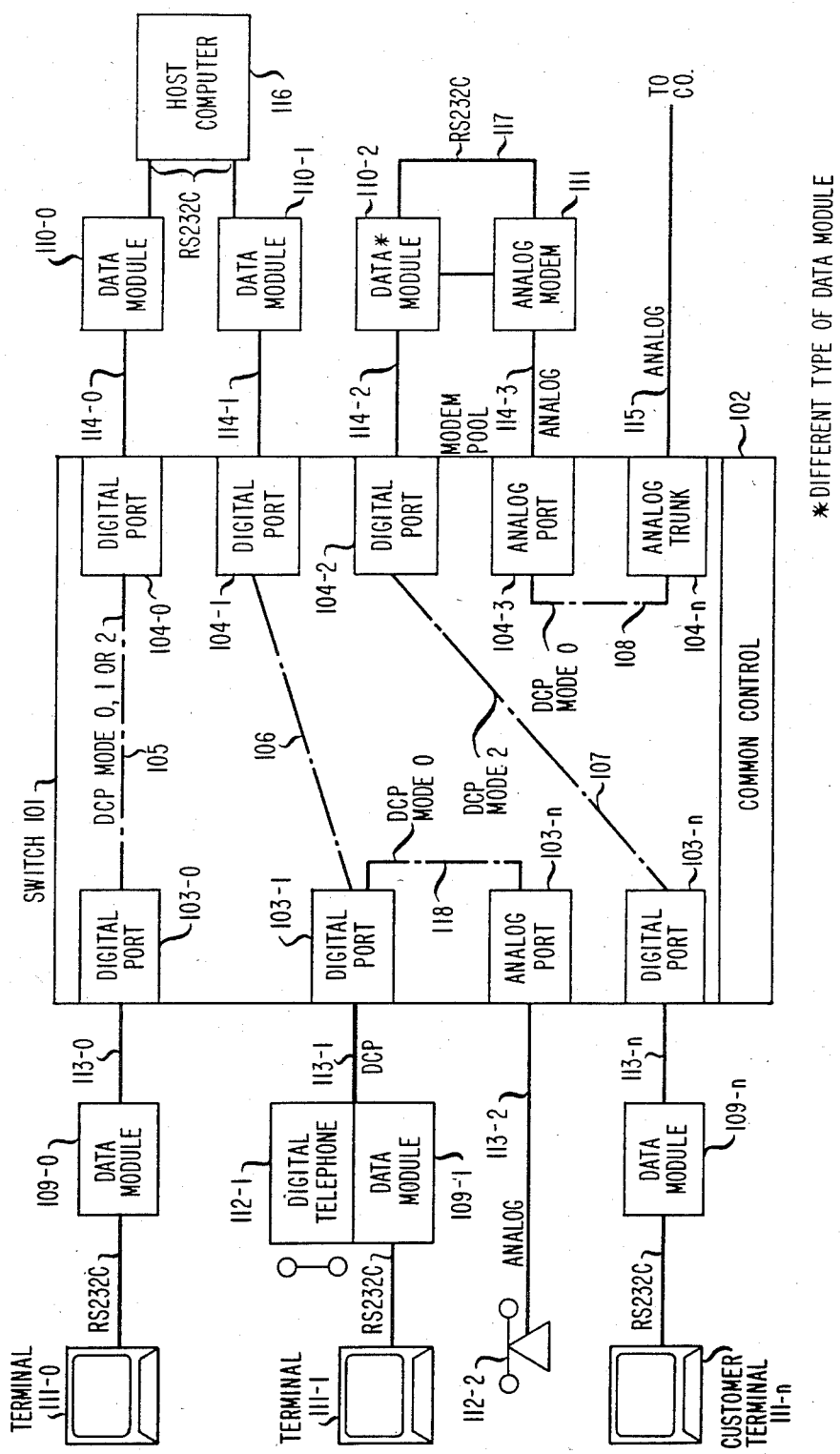
FIG. 1 discloses a system embodying the invention.

FIG. 1 discloses a switching system comprising one possible embodiment of the invention. The elements of the system include a switch 101 and a common control 102. Common control may include a processor and memory which together control the operation of switch 101 which advantageously is of the digital type. Switch 101 includes ports 103-0 through 103-n on its left side and ports 104-0 through 104-n on its right side. Ports 103 are connected via paths 113 to equipment at the station served by each port. The specifics of the provided equipment at each station is dependent upon the service to be provided by the station. Thus, path 113-0 is connected to data module 109-0 and in turn, to terminal 111-0 through an RS232C interface. A data module provides an interface between the DCP information transport mechanism described in this invention and standard industry data equipment. Path 113-1 is connected to data module 109-1 and to digital telephone 112-1. Data module 109-1 is connected to terminal 111-1. Path 113-2 is connected directly to an analog telephone 112-2. Path 113-n is connected to equipment similar to that of path 113-0. Ports 104-0 through 104-3 are connected over paths 114 to various types of equipment. Paths 114-0 and 114-1 are connected to data modules 110-0 and 110-1 and, in turn, to a host computer 116. Paths 114-2 and 114-3 connect to data module 110-2 and an analog modem 111, respectively. Path 115 is an analog central office trunk. The service provided by data module 110-2, modem 111, and trunk 104-n, is a pooled modem resource whereby data terminals served by digital switching system 100 can utilize analog transmission facilities. The data module/modem pair provide digital to analog conversion equipment.

The data/voice switching system 100 of FIG. 1 connects to diverse types of equipment and must therefore be capable of providing the required call service for these equipments. The switching system 100 is of the digital type and it exchanges information between the switch 101 and the data modules 109 and 110 in a time multiplexed DCP frame format of the type shown in FIG. 2. Each DCP frame comprises 20 bits which are subdivided into a 3 bit F (Framing) field, a 1 bit S (Signalling) field and two 8 bit I (Information) fields. The F field carries the framing information required to synchronize the receiving facilities with the information in the rest of the frame. The S field is used to transmit signalling messages in the HDLC protocol in each direction between the processor of common control 102 and the stations data modules 109 and 110 or digital telephone 112. These signalling messages, when transmitted to the station, specify various station control operations initiated by common control 102. These messages also contain station request and status information on transmissions from the stations to common control 102.

The two I fields independently transmit information comprising the subject matter of a call connection between stations. The $I_1$ field on path 113-1 may, for example, transmit call information to and from digital telephone 112-1; the $I_2$ field of path 113-1 may transmit call information to and from data terminal 111-1. Digital telephone 112-1 and terminal 111-1 can concurrently be connected to different called stations via their respective I fields. Switching system 100 is responsible for connecting the I fields to the required destination. The S field is used to set-up (and take down) the switch connection which allows the transmission of an I field between two stations.

Figure 3:
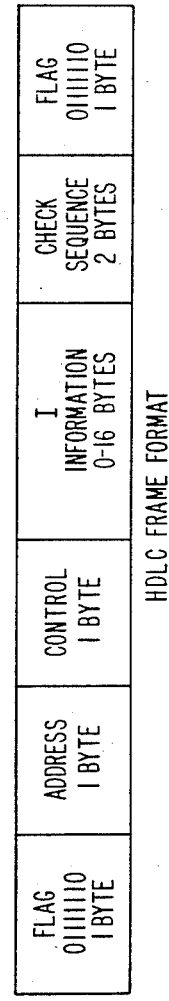
FIG. 3 illustrates the HDLC frame format.

FIG. 3 discloses the HDLC frame format used on the S field messages. The S field messages are generated as parallel multibyte messages at the transmitting end, such as, for example, at station qata module 109-1. They are then converted from parallel to serial, encoded into the HDLC frame format of FIG. 3, and transmitted serially over path 113-1 from the data module 109-1 to the receiving end, such as, for example, to data module 110-0. Prior to this transmission, the flag bytes of FIG. 3 are inserted to separate each message. Also, when no S field messages are being transmitted, the transmission circuitry generates and transmits continuous flag characters.

Each HDLC frame comprises, in addition to a flag character, one 8 bit byte as an address character, one 8 bit byte as a control character, and a variable number (0 through 16) 8 bit bytes of signal or message information comprising the actual S field signalling messages transmitted from the station to common control or vice versa. The remainder of the frame includes a 2 byte CRC check sequence which is inserted for error detection purposes. The right-hand flag character on FIG. 3 separates the message from any subsequent message. The transmission circuitry at each end and the associated receiving circuitry also perform the conventional HDLC zero insertion and deletion functions to provide transparency of message information. That is, no bit pattern within a message can be the same as that of a flag character.

Figure 2:
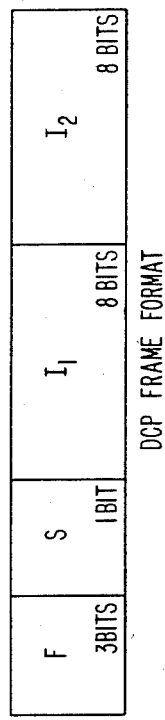
FIG. 2 illustrates the DCP frame format.

The DCP frames of FIG. 2 are received, as well as generated, continuously by each digital port. The two I fields contain the call information that is to be transmitted to the other port or ports involved on a call. The information received in these fields is applied by the digital port 103 to the switching network (not shown) of switch 101. The network may be, for example, a time slot interchanger that functions to connect one port with another port during an assigned time slot. The network performs a time slot interchange function which transfers the information received from a time slot of the first port to the time slot assigned to the other port. Each I field in the DCP frame received by the port is applied to an independent time slot in the switch. Thus, each I field can be independently connected to any destination. When a port receives I field information during its associated switch time slot, it transmits it over the associated communication path 113 to its customer station. Switch 101 and the manner in which the I field information is received by one port and transmitted to another port comprises no part of the present invention and therefore are not discussed in further detail.

The system of FIG. 1 serves different types of call connections that requires different types of service. The interconnection of digital port 103-0 with digital port 104-0 via path 105 permits terminal 111-0 to exchange information with host computer 116. Path 106 similarly permits terminal 111-1 to access the host computer 116. Path 118 establishes a call connection between digital telephone 112-1 and analog telephone 112-2. Paths 107 and 108 enable terminal 111-n to establish a connection through modem pooling facilities 110-2 and 111 to CO trunk 115 which extends the connection to another terminal or a computer via analog transmission facilities.

It can be seen from the various types of connections served by switching system 100 that the services required on each connection are diverse and dependent upon the requirements of the interconnected station devices. The system of the present invention transmits information between interconnected station devices by three different formats which are herein defined as being DCP Mode 0, DCP Mode 1, and DCP Mode 2. DCP Mode 0 is a 64 Kbps transmission and involves the exchange of bulk data or digitalized voice between the connected station devices. All 8 bits of the I field are used to carry the data or voice. The connection may be served by either the $I_1$ or the $I_2$ field of the DCP frame as shown in FIG. 2. Mode 1 is similar to Mode 0 except that 1 of the 8 bits of the I field is used to signify whether the remaining 7 bits of the I field contain data or control information. The data rate provided by DCP Mode 1 is 56 Kbps.

Figure 4:
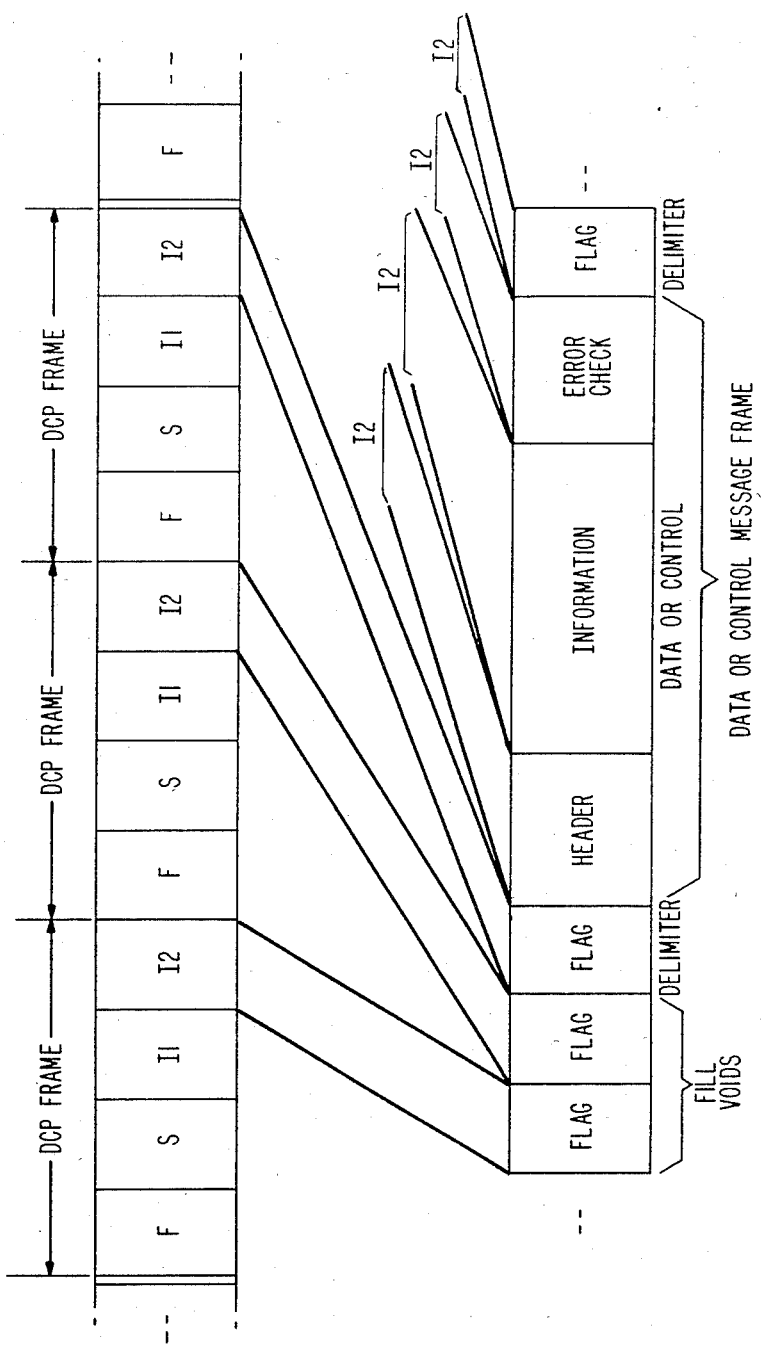
FIG. 4 illustrates the DCP mode 2 I field format.

DCP Mode 2 provides data and control information to be transported in the DCP I fields via the format shown in FIG. 4. The data or control information is combined with a header field and an error check field, then transmitted as a message via the same block delineation strategy as employed in HDLC. That is, data or control messages are transmitted as frames of variable length which are delineated by a special bit pattern (01111110) known as a flag. In the absence of data or control messages, flags are consecutively sent. As indicated in FIG. 4, the DCP Mode 2 information is broken up into 8 bit chunks and transmitted within consecutive DCP frames within an I field. No synchronization is assumed between a DCP I field and the Mode 2 message. That is, the flag characters, header field, data or control or error check field, do not have to start at the first bit of an I field. A flag could be divided between two consecutive DCP frames. DCP Mode 2 provides data transport mechanisms for a wide variety of data formats and protocols for data rates up to 50 Kbps. It also provides a robust "end-to-end" control transport mechanism.

The connections shown within switch 101 on FIG. 1 illustrate the use of the different DCP modes. Connection 105 may involve either Mode 0, 1 or 2 transmission depending upon the data rates required between terminal 111-0 and the host computer 116. If Mode 0 or 1 are used, however, the physical interface between the data equipment and data module would likely be different from RS232C, or perhaps RS449, which is a similar but higher speed standard interface. Mode 0 would be used if 64 Kbps synchronous data transmission were required. Mode 1 would be used if 56 Kbps synchronous data transmission were required. Mode 2 would be used if synchronous or asynchronous data transmission below 50 Kbps were needed.

Path 118, which establishes a connection between digital telephone 112-1 and analog telephone 112-2, may be of the DCP Mode 0 type since the required function of this connection is to transmit encoded voice signals at a 64 Kbps rate between the two telephones. Analog port 103-n makes the analog to digital and digital to analog conversions required on the call. Path 107 interconnects terminal 111-n with a terminal or computer served by the public switching network. Path 107 would be of the Mode 2 type. This is because all analog modems operate at less than 50 Kbps. Path 108 would be operating in Mode 0 because it is carrying analog information from the analog modem to the analog trunk.

The serving of this Mode 2 call connection requires the system to exchange both data as well as control information within the I field used on the call. Terminal 111-n is connected to its associated data module by a plurality of conductors using a suitable format such as RS232C. As such, these connections include data conductors as well as a plurality of control conductors for control signalling purposes. The data received on the data conductors from the terminal by the associated data module is inserted into a data message frame of the type shown in FIG. 4 and transmitted to the other end in successive I fields of the DCP frame. The plurality of control and signalling conductors extending between the terminal and its data module are scanned continuously by the data module. When a change of state of a control conductor occurs, the data module generates the appropriate control information, inserts it into the information field of the FIG. 4 Control Message Frame and inserts the message frame, 8 bits at a time, into the I field of successive DCP frames. The receiving data module receives this control message, strips off the protocol support fields and converts the received control information message contained in the information field into appropriate control potentials which are applied to the control conductors of the receiving modem. This mechanism permits the two connected data devices to exchange data and control information with each other to the same extent as if they were interconnected by hard wiring.

Figure 5:
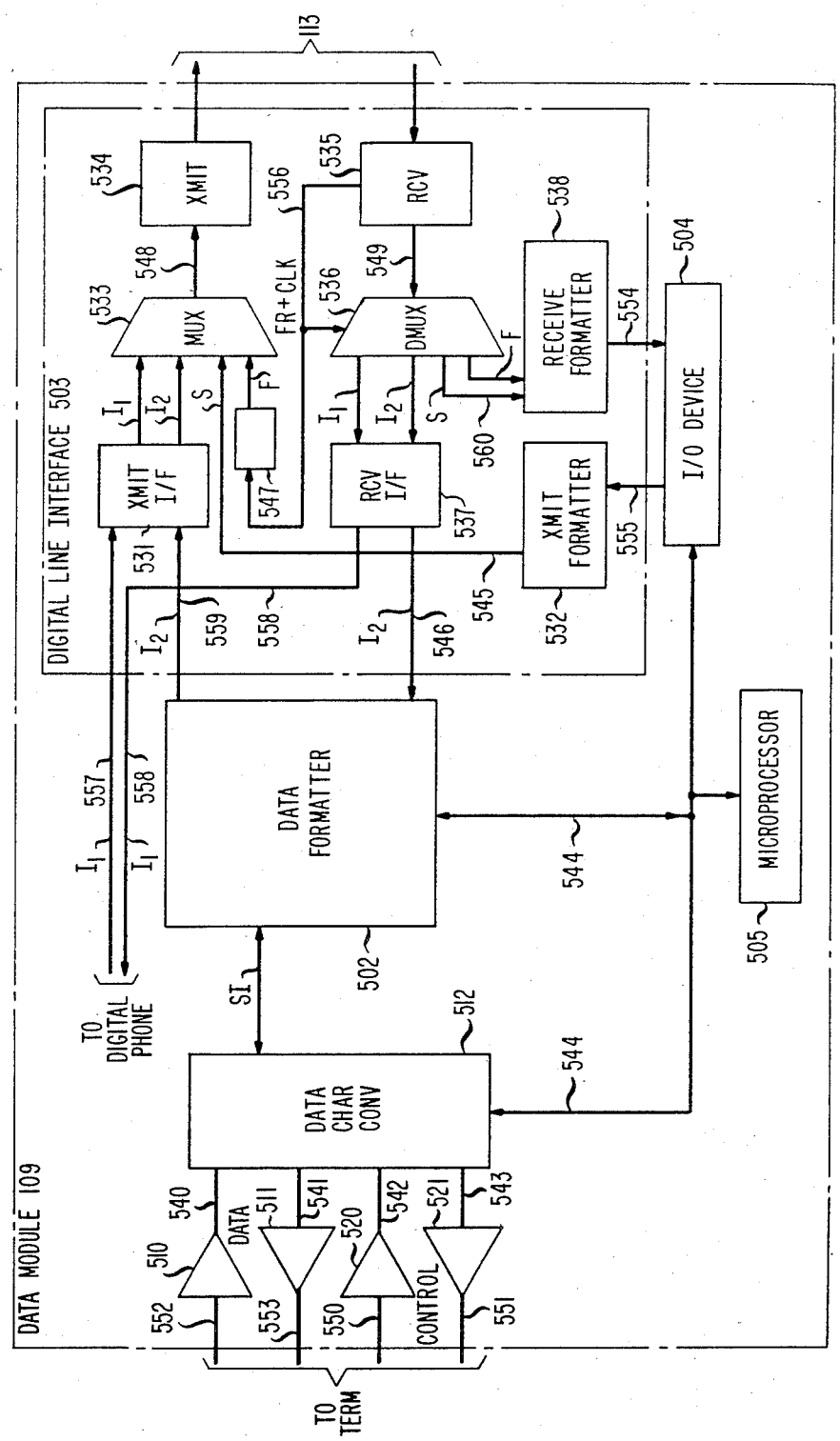
FIG. 5 illustrates details of a data module 109.

The data modules 109 and 110 are shown in further detail on FIG. 5. The data module comprises a data character converter 512, a data formatter 502, a digital line interface 503, and a control microprocessor 505. The data module is an interface between a data device (terminal, computer, modem, etc.) and a digital port. Its function is to facilitate an interchange of data and control signals in the DCP format between the data device and its associated port 103 or 104.

Data module 109 operates in different modes depending on whether a connection through switching system 100 is set-up or not. Prior to a connection being set-up, the data and control signals of the RS232C interface are routed by the data module to the DCP S field. This allows the terminal to communicate with the switch common control 102 to set-up a connection. When the call set-up phase is completed, the data module routes the data and control signals to one of the DCP I fields. The I field information is connected to the appropriate destination device through switch 101 to allow the data transfer session to occur.

The data character converter 512 exchanges data with its associated data device via paths 552 and 553 and the associated EIA interface devices 510 and 511. Similarly, over paths 550 and 551 as well as interface devices 520 and 521, the data character converter exchanges multiple control signals with its associated data device. The function of the data converter with respect to the data device connected to path 552 is to receive data from the data device, convert it from serial to parallel, and transmit it in 8 bit segments termed bytes to the data formatter 502 or to microprocessor 505. When sent to the data formatter 502, the data is routed to the I field. When sent to microprocessor 505, the data is routed to the DCP S field. Converter 512 performs the reciprocal function in the reverse direction in which data is received from the formatter 502 or microprocessor 505 for transmission to the data device.

The function of converter 512 with respect to the control signals on path 550 is to scan these signals periodically and, when each change of state is detected, to generate an appropriate message for transmission to microprocessor 505. Microprocessor 505 is responsible for sending the control lead information to the data formatter 502 and eventually to the DCP I field or to I/O device 504 and eventually to the DCP S field. In the other direction, converter 512 receives control lead state information from microprocessor 505 over path 544. It applies this information to path 551. Microprocessor 505 receives the control lead state information from either the DCP I field or S field depending on the state of the call.

The purpose of formatter 502 is to receive the data or control information from converter 512 and to reformat this information into the DCP Mode 2 message format of FIG. 4 for transmission over the I field to the other data module connected on the call. This is the case for Mode 2 only. For Modes 0 and 1 the only function of the formatter 502 is to pass the received information to the digital line interface 503 which inserts it into the I field. The formatter 502 performs the reciprocal function in the reverse direction in which I field information is received and applied to the data character converter 512.

The function of the digital line interface 503 on data transmitted from a data or devices to a port is to receive the $I_1$ information from the associated digital telephone, if provided at the station, receive the $I_2$ information from the associated data device via converter 512 and formatter 502, receive the S field information from microprocessor 505, and assemble this information for transmission on each DCP frame to the associated port circuit.

The manner in which data is received from a terminal and formatted for transmission to a port over the I field is described in detail in connection with the subsequent description of FIGS. 6, 7 and 8. In addition to this I field function, the data module of FIG. 5 is capable of formatting terminal data or control lead status into control messages to be transmitted to the switching system control processor via the DCP S field. The S field carries signalling information between the station and the control processor via an HDLC protocol. This protocol is transported between the port and station by 1 bit in each DCP frame, as shown in FIG. 2. The data device or terminal data carried in the S field is used to provide a call set-up function when the terminal first becomes active. For example, terminal dialing of the called station number can be accomplished in this manner without the use of an accompanying telephone or touch tone pad at the terminal. This function is described in detail and is the subject of the invention disclosed in the copending application of G. N. Squicciarini, Ser. No. 514,882, filed July 18, 1983. The operation of the data module in supporting this capability is described in the following paragraphs.

The data module is controlled in its operation by microprocessor 505 which extends via path 544 to converter 512 and data formatter 502, and to interface 503 via I/O device 504. The data devices served by the data module generate RS232C control signals, data signals and timing signals. These signals are converted by interface devices 510, 511, 520, and 521 from RS232C signal levels to signal levels appropriate for the operation of the data module. Devices 510 and 511 are a part of the circuitry by means of which data signals from the terminal are exchanged between the terminal and data character converter 512. Devices 520 and 521 perform the same function with respect to the RS232C control leads of the terminal. Converter 512 provides control signal and data signal storage functions. The control signal storage circuitry includes registers to store the current state of the various EIA control leads comprising path 550 from the terminal. Converter 512 also includes the necessary synchronous data interface registers, asynchronous data interface circuitry (termed Universal Asynchronous Receive Transmitter or UART), and buffering which perform a serial to parallel conversion of the data and stores the received data before it is applied to the formatter 502 or the microprocessor 505.

Microprocessor 505 periodically scans the control signal storage registers in converter 512 via path 544 to detect any changes of state of the RS232C control leads of path 550 extending from the data device to converter 512. When a change of state is detected during the call set-up phase, the microprocessor 505 generates a control message that eventually can be transmitted through the S field to the system control 102. Microprocessor 505 applies this generated control message, 1 byte at a time, over path 544 into I/O device 504 which latches each byte. The message is then applied from device 504 to the digital line interface 503 for transmission via the S channel of successive DCP frames as subsequently described. Similarly, the microprocessor can receive S channel messages containing RS232C control lead information from interface 503 through I/O device 504. Microprocessor 505 will then update control storage registers in converter 512 to contain the new information. From there, they are applied via the control leads 551 to the terminal. Also, for terminal dialing and other purposes, the data information generated at a terminal and applied over path 552 to the converter 512 may be extended via path 544 to the microprocessor 505. From there, the processor generates the appropriate S field message by converting the information into a format of the type shown in FIG. 3 and transmitted via the S field to system control 102. After the call is set-up, the operation is the same except that the control signal messages are sent via the I field to the other data device.

In summary, the data module 109 may generate S channel messages from either the received data information or the received control lead information prior to the establishment of a call. This information is extended from converter 512, over path 544 to the microprocessor 505 which takes the received information and inserts it into the HDLC format of FIG. 3 and then applies it as an HDLC message to interface device 503 for transmission via the S field to the associated port circuit. The associated port receives this information and extends it to the system control 102. This is described in detail in the copending application of S. R. Peck et al, Ser. No. 539,813, filed Oct. 7, 1983. Each multibyte S field message is transmitted 1 bit at a time in the S field of successive DCP frames to the associated port. The port receives the S bit of successive DCP frames, converts them from serial to parallel and then transmits the HDLC message to system control 102.

The data module can also generate "end-to-end" control messages using Mode 2 which, after a call connection is established, are exchanged between the two data modules connected on the call. One application of these "end-to-end" control messages is to signal the state of RS232C control leads across the connection. As a periodic update or when a change of state of the control leads occurs, it is sensed by converter 512, sent to microprocessor 505, and an appropriate control message is generated by the microprocessor 505, applied over path 544 to the data formatter 502 and from there extended via the digital line interface 503 for insertion into the I field of the DCP frame transmitted to the associated port circuit 103 or 104. These control messages advise each data module on the connection of any new change of state of the control leads of the other data module and thus permit the two data devices to communicate with each other to the same extent as if they were connected via a 25 wire RS232C cable.

The manner in which the I field data message and the I field control messages are transmitted to the other terminal involved on the call, once the call connection is established, is described in detail in connection with FIGS. 6, 7 and 8. However, the general function of the formatter 502 and the digital line interface 503 operation is described in the following paragraphs.

Microprocessor 505 continues to scan the terminal control leads for changes of state in the same manner as already described in connection with S field messages. When each change of state is detected, the microprocessor generates a control message in the DCP Mode 2 format which is applied to the formatter 502 for transmission via the DCP I field to the other terminal on the call. Formatter 502 generates idle flags for insertion into the DCP I field when no data is being received from its associated terminal. These idle flags are periodically received by the digital line interface 503 and transmitted over port 103 via the I field to the associated port. However, once a terminal begins generating data characters, formatter 502 formats the received data into the message format shown in FIG. 4. From there, it is applied in 8 bit increments to the interface 503 which inserts it, 8 bits at a time, into the I field of successive DCP frames.

Digital line interface 503 interconnects the data module with the associated port over path 113. The interface 503 is controlled in its timing by a circuit within the RCV circuit 535 which recovers the clock signals from the DCP frames serially transmitted by port 103 to the data module 109 over path 113. These clock signals are used by the interface 503 both to receive DCP frames from the port and to generate DCP frames for serial transmission to port 103. The S channel messages in the format of FIG. 3 are extended to transmit formatter 532 from I/O device 504. Each DCP field is generated by multiplexor 533 which receives the 1 bit S field information from transmit formatter 532 and receives the two 8 bit I fields from the transmit interface device 531. Device 531 receives the $I_2$ field of 8 bits per frame from formatter 502 and receives the $I_1$ field from the associated digital phone at the station, if it is provided. The F field bits are applied by device 547. Thus, path 548 of the interface 503 contains all fields of a DCP frame and this information is extended through transmitter 534 for transmission over the path 113 to the port 103.

The DCP frames (FIG. 2) transmitted to data module 109 by a port 103 are received and decoded in reciprocal fashion in interface 503. The DCP information is received at element 535, extended over path 549 to demultiplexor 536 which separates the received information into the appropriate I₁, I₂, S, and F fields.

The S field information is applied over path 560 to receive formatter 538 which extends it via I/O device 504 to microprocessor 505. Microprocessor 505 reads the S field control message received from I/O device 504 in 8 bit increments and interprets each message. If the message requires that the digital terminal control lead state be changed, microprocessor 505 loads the information into the control register in data character converter 512 which extends the message via control leads 551 to the terminal.

I field messages are extended from demultiplexor 536 to receiver interface 537 which sends the I₁ information to the digital telephone, if present, and I₂ information to data formatter 502 on path 546. Data formatter 502 receives each 8 bit I field byte from receive interface 537 and transmits this information through converter 512 to the terminal on path 553 if the information represents data to be displayed at the terminal. If the I field information represents a control message containing RS232C control leads state information, this is detected by the first bit of the header field of FIG. 4 by formatter 502 and the information portion of the field is then applied to microprocessor 505. The microprocessor interprets the message and then modifies the control register in converter 512 which contains the RS232C control lead state. This new control lead state extends to the terminal over path 551.

FIGS. 6, 7 and 8, when arranged as shown in FIG. 9, disclose further details of data character converter 512 and data character formatter 502. The data character converter is connected to the data device or terminal it serves via the plurality of leads shown on the left side of FIGS. 6 and 8. The data formatter is connected via paths 559 and 546 to digital line interface 503 as shown on the right side of FIG. 7.

Data character converter 512 exchanges data signals with its terminal over leads 552 and 553 and elements 510 and 511. Converter 512 also exchanges control signals with its terminal via leads 550 and 551 and elements 520 and 521. It also receives clock signals from the terminal via path 644 and element 621 and sends clock signals to the terminal via path 645 and element 646. Data conductors 552 and 553 carry the data signals that are exchanged between the terminal and the converter 512. The control signals on paths 550 and 551 carry RS232C control lead information. The data signals on path 552 are received and stored by the converter 512 and eventually are applied, after the call connection is established, by the data formatter 502 to the I fields of DCP path 559 extending to digital line interface 503, as described later. Before the call is established, the data signals are applied to the microprocessor 505 when the system sends an S channel message to common control 102.

The following paragraphs describe how converter 512 and formatter 502 are used to generate DCP control messages which carry control lead status from one data device to another after the call connection is established. The control leads 550 may be of the RS232C type and they are applied to and latched by input register 801 where they are available for access by the microprocessor 505. This register is read periodically by the microprocessor 505 via interface 804 and path 626. The microprocessor analyzes the register contents on each scan to determine if the currently scanned information represents a change of state from the previous scan. If the information has changed, the microprocessor formats a DCP control message of the type shown in FIG. 4 and causes it to be sent out over the DCP I field as subsequently described. The purpose of this message is to advise the receiving end terminal of the current state of the control leads of the transmitting terminal in the same manner as if the control leads of the two terminals were directly connected. The RS232C control leads are therefore part of an "end-to-end" control mechanism whose status is sent out over the I field to the receiving terminal.

The microprocessor 505 outputs the control message information it generates into the data formatter 502. Specifically, the generated message is applied by microprocessor 505 through interface 804 to bus 626. From there, it is extended to the lower input of multiplexor 702. The multiplexor is controlled by path 642 so that its lower input is now connected to its output on path 718.

This multiplexor can either receive terminal data from path 628 or control messages from microprocessor 505 on path 626. The microprocessor periodically enters information into register 803 to control the position of the multiplexors on FIGS. 6 through 8. At this time, the information in register 803 causes the potential on paths 642 to be such that the input 626 of multiplexor 702 is active and connected to the multiplexor output on path 718. Thus, path 642 performs a data/control function of multiplexor 702.

The formatted message from microprocessor 505 on path 718 is applied to shift register 704 which outputs the message information serially to multiplexor 705 via path 721 and to the CRC generator 703 via path 719. The serialized message is applied to path 721. The cyclically redundant code from generator 703 is applied to the transmit multiplexor 705 over path 720. The flag and header generator 701 applies the appropriate flags and headers to multiplexor 705 over path 717. Element 701 is controlled via path 735 by Transmit Controller 708. The multiplexor 705 is controlled in its operation by path 724 so that its output path 722 contains the control message generated by microprocessor 505 together with the protocol support fields of FIG. 4.

This information from element 705 is then applied to zero insertion element 706 which performs an HDLC-like zero insertion function and causes the resultant frames as shown on FIG. 4 to be applied over path 723 to the lower input of multiplexor 707. Formatter 502 and character converter 512 are assumed to be operating in Mode 2 and, therefore, by virtue of the signals on path 633, input 723 of multiplexor 707 is currently connected to its output on path 559 which extends to interface 503. Interface 503 takes this message frame and, as described, inserts it into the DCP I₂ field serving the terminal. The message frame is transmitted in the I₂ field to the other terminal on the call connection.

The following paragraphs describe how formatter 502 and converter 512 receive I₂ field control message frames from the other terminal or data device connected on the call and pass them to microprocessor 505 which outputs the information to the data device or terminal connected to converter 512. Microprocessor 505 outputs the control lead states to the terminal via output register 802 and path 551 in response to the received message.

An I₂ field control message comes into formatter 502 on path 546 serially and is extended through multiplexor 716 to its output 726 over which the message is applied to the receive unformatter 711. This element together with CRC element 715, zero delete element 714 and the flag/header detector element 713 perform their indicated functions to remove the message framing elements and determine whether the received information is valid. Element 713 analyzes the header to determine whether the received information represents terminal data or a control message. It is assumed that the information now received represents a control message and therefore the output of element 713 on path 733 controls multiplexor 709 so that its input 731 is connected to its output 626. The information field portion of the received message frame is applied from the receive unformatter 711 over path 730 to shift register 710 which converts the information from serial to parallel and extends it over path 731 through multiplexor 709 to path 626. From there it is extended through interface 804 to the microprocessor 505.

The message now received by the microprocessor represents a newly detected change of state of the control leads of the terminal at the other end of the connection. The microprocessor analyzes this information and outputs the appropriate state information into register 802. From there the control lead state information is applied over path 543, elements 521 and path 551 to the control leads of the terminal.

In general, the control messages received from a distant terminal by microprocessor 505 may be passed to register 802 and the local terminal without modification. However, the microprocessor has the capability of analyzing and modifying the received messages before forwarding them to the local terminal through register 802. This might be necessary if the connection between data devices is meant to emulate a "null-modem" connection; that is, a connection which replaces two analog modems.

The following paragraphs describe the operation of the converter 512 and the formatter 502 in response to the reception of terminal data from a terminal or data device at the other end of the connection. This data is received as data message frames having the format of FIG. 4. In this case however, the data/control bit of the header field contains a bit indicating that the information represents terminal data rather than a control message.

The received frame of the type shown in FIG. 4 is received on path 546, extended through multiplexor 716 to path 726 and, from there, to receive unformatter 711. This data goes through the same operations with elements 713, 714 and 715 that the priorily described control message did. Thus, the output of the unformatter 711 on path 730 represents the data contained in the information field of the received FIG. 4 type frame. This information is applied to shift register 710 which does a serial to parallel conversion. The output of the shift register is extended over path 731, through multiplexor 709 to path 732. From there it is extended to the receive FIFO 618. The input of multiplexor 709 is connected to its data output 732 at this time since the flag/header detect element 713 determines that the received information represents data and applies a signal to path 733 which causes multiplexor 709 to activate its output 732.

In general, a plurality of characters may be received in rapid order during a Mode 2 data frame. These characters are stored up in the FIFO 618 since they are received at a faster rate than the local terminal can accept them.

The output of FIFO 618 goes to the input of multiplexor 617. From there the data is routed either to the output of the multiplexor on path 639 for synchronous data or to the output of the multiplexor on path 640 for asynchronous data. The difference is that asynchronous data is routed via multiplexor 616 and through UART element 614. Thus, assuming the information to be of the asynchronous type, the data received by multiplexor 617 is applied over path 640, through multiplexor 616 and then over path 637 to UART element 614. The UART element does a parallel to serial conversion on the data which is now received character by character. It also adds the necessary start and stop bits to frame each character as is standard asynchronous character protocol.

Each character comes out of UART transmitter 614 on path 636 framed with start and stop bits. From there it is extended through multiplexor 612, over path 630, through multiplexor 611, over path 541, through element 511, and over path 553 for transmission to the local terminal. The UART is double buffered to accept two characters at a time because of the way it is implemented. However, if desired it can be adapted to accept as many characters as may be desired. It transmits out one character at a time at a rate that is set by the customer and the baud rate generator 615. This rate may be anywhere from 110 bits per second up to 38.4 Kbps. The baud rate of the UART is set by the baud rate generator 615 under control of microprocessor 505. The baud rate that the data module can be operated at can be set-up manually with internal switches connected to input register 801 or via an S field message from common control 102. Microprocessor 505 periodically scans the state of the switches or is updated by common control 102 as to the correct baud rate. Information from the common control 102 overrides the switches if there is a discrepancy.

Microprocessor 505 controls the synchronous/asynchronous status of multiplexors 609, 617, 604, and 612 via paths 634 and register 803. The microprocessor is advised by the synchronous/asynchronous switch on register 801 or S field messages whether it should operate in the synchronous or asynchronous mode.

The preceding paragraphs describe how converter 512 operates in the asynchronous data mode. The following paragraph describes the operation of the converter for the synchronous mode. In this case, the information in FIFO 618 is extended through multiplexor 617 over path 639 to the input of shift register 613. This register does a parallel to serial conversion and shifts out the data through multiplexor 612, over path 630, through multiplexor 611, path 541, element 511, and path 553 to the local terminal.

As previously discussed, synchronous data requires an associated clock signal to be transmitted between the local terminal and the data module. This clock signal can be supplied by either the local terminal or by the data module 109 of FIGS. 6, 7 and 8. Path 644, element 621 element 648 and path 622 apply timing signals received from the local terminal to shift registers 605 and 613 to control the timing of their operation. An alternate synchronous data clocking scheme allows the transmit synchronous data clock signal on path 645 to extend from the baud rate generator 615 to the local terminal via element 646 as well as to shift registers 605 and 613 via element 648 . Clock select multiplexor 648 determines which clock scheme is used to supply clock signals to shift register 605 and 613. Multiplexor 648 is under control of microprocessor 505 through register 803 and path 647.

The following paragraphs describe the operation of converter 512 and formatter 502 when data is received from the local terminal connected to converter 512. The data is received on path 552, extended through element 510 and further extended through multiplexor 603 and multiplexor 604. From there, for synchronous data, the data is extended to the output 619 of multiplexor 604 and applied to the input of shift register 605 which does a serial to parallel conversion of the data under control of the clock signals on path 622. The output of the shift register is 8 bit parallel information which is extended through multiplexor 609, over path 627 to transmit FIFO 610 where several 8 bit quantities may be stored consecutively. The output of FIFO 610 extends over paths 628, through multiplexor 702, over paths 718 to shift register 704.

Multiplexor 702 is now in the data mode with its input 628 active since converter 512 is now processing terminal data rather than a control message from microprocessor 505. Shift register 704 performs a parallel to serial conversion and outputs the serial information over path 721 to multiplexor 705. This multiplexor together with elements 703 and 701 incorporates the data into a FIG. 4 type frame as priorly described and outputs the resultant frame over path 723, through multiplexor 707 to path 559. From path 559 the frame is extended to the interface 503 which inserts it into the $I_2$ field for transmission via the switch to the other terminal connected on the call.

The transmitted message, per FIG. 4, consists of flags before and after the message. It further includes a CRC check at the end of the message with the zero insertion mechanism being used within the message for transparency. Thus, the signal on path 559 is a 64 Kbps bit stream which is put into the $I_2$ field for transmission via the switch to the other connected terminal.

The position of multiplexor 702 is controlled by microprocessor 505 and at this time the 628 input of the multiplexor is active since the circuit is processing terminal data rather than a control message. Multiplexor 705 is controlled by transmit control circuitry 708 which receives clock signals from the receive unformatter 711.

The following paragraphs describe the operation of converter 512 and the formatter 502 when asynchronous type data is received from the local terminal. Under such conditions, microprocessor 505 controls register 803 and, in turn, the potential on path 634 so that multiplexors 604, 612, 609, and 617 are in their asynchronous mode.

Asynchronous data is received on path 552, extended through element 510 and multiplexors 603 and 604, and is applied over path 620 to UART receiver 607. The UART receiver takes this serial information, strips off the start and stop bits and applies the resultant characters over path 624, through multiplexor 608, path 625, multiplexor 609, and path 627 to the input of FIFO 610. The FIFO receives and stores this character information and applies it out over path 628, through multiplexor 702 and path 718 to shift register 704. From there the information is processed in the same manner as already described by elements 701, 703, 705, and 706, and applied as a FIG. 4 type frame over path 723 and multiplexor 707 for transmission to the interface 503 over path 559. From there it is extended in the I field of the DCP frame to the other terminal.

Asynchronous characters received by converter 512 may, at the beginning of a terminal logon and before the call connection is established, be transmitted to microprocessor 505 for terminal dialing and other system control purposes, if desired. In this case the data characters received by UART receiver 607 are extended over path 624, through multiplexor 608, to bus 626, for transmission to the microprocessor 505 through interface 804. In a similar manner, the microprocessor may extend characters to be displayed on the terminal through interface 804, over path 626, through multiplexor 616 and path 637, extending to UART transmitter 614. From there, the characters are extended in the same manner as already described through the remainder of the circuitry shown on FIG. 6 for transmission to the terminal.

The following paragraphs describe how the terminal and the circuitry of FIGS. 6, 7 and 8 may be operated in either Mode 0, Mode 1 or Mode 2. Microprocessor 505, under control of information received from either internal switches or from common control 102 via the S field, determines the mode of operation of the circuits of FIGS. 6, 7 and 8. This information is stored in register 803 which, in turn, applies the appropriate control potentials via path 633 to control the state of multiplexors 603, 611, 716, and 707. This signal causes each of these multiplexors to operate in either their Mode 0, Mode 1 or Mode 2 state. The operation of these multiplexors and the rest of the circuitry of FIGS. 6, 7 and 8 has already been described in detail for Mode 2.

Mode 0 serves a 64 Kbps bit stream when voice or bulk data is to be exchanged on the connection. For this mode, the data received by converter 512 from the terminal is routed through multiplexor 603 to path 601 and extended over this path, through multiplexor 707, to path 559, which extends to the interface 503. Interface 503 inserts this information directly into the $I_2$ field of the DCP frame.

For Mode 1 operation, the received information is extended through multiplexor 603, over path 602, to the Mode 1 formatter 606 which takes the 56 Kbps information and and breaks it into 7 bit quantities. A D/C bit equal to 1 is added to each 7 bit quantity to bring the overall data rate to 64 Kbps—the raw bit rate of the I field. A D/C bit 1 specifies that the remaining 7 bits represent data exchanged between the two connected devices. The call can be put into control mode to transmit a control message by microprocessor 505 through path 626 to the M1 formatter. This allows message representing control states to be transmitted from one data module to another. When this occurs, the D/C bit equals 0. The 64 Kbps stream is then extended over path 643, through multiplexor 707 and path 559 to interface 503 for insertion into the $I_1$ field.

Character converter 512 and the formatter 502 operate in a similar manner in response to information received on Modes 0, 1 and 2. The operation of these circuits for Mode 2 has already been described. For Mode 0, the received information on path 546 is extended through multiplexor 716, further extended over path 632, through multiplexor 611, and then over path 541, element 511 and path 553, to the associated terminal. For Mode 1, the received information is applied via multiplexor 716 to path 734 and applied to unformatter 712 which deletes the extra bit added by the element at the other end corresponding to formatter 606. The resultant 56 Kbps bit stream is then extended over path 631, through multiplexor 611, over path 541, element 511 and path 553 to the associated terminal. The drawings and description show the data device being served by the I2 field and a digital telephone being served by the I1 field. The I1 and I2 fields are identical and therefore it is immaterial which I field serves which device. It is the users choice whether the two I fields serve two digital telephones, a telephone and a termianl, or two terminals. It is also possible to leave one I field unused and to use the other I field to serve either a phone or a terminal.

What is claimed is:

1. A method of operating a data communication interface connected by data leads and control leads to a data device at a first location, said method comprising the steps of:
   (1) receiving data signals from said data device over said data leads and control signals over said control leads,
   (2) forming a multifield data message from said received data signals,
   (3) forming a multifield control message from said received control signals,
   (4) generating cyclically reoccurring time multiplexed frames each having a plurality of fields including an I (Information) field,
   (5) dividing each of said messages into a plurality of bytes and inserting each byte of a message into the I field of one of said time multiplexed frames, and
   (6) transmitting said time multiplexed frames containing said inserted message bytes over a communication path from said interface to another data device.

2. The method of claim 1 in combination with the additonal steps of:
   (1) applying said transmitted frames to an interface at a second location serving a device having data and control leads,
   (2) applying signals contained in a transmitted data message to said data leads of said last named device, and
   (3) applying signals contained in a transmitted control message to said control leads of said last named device.

3. The method of claim 2 in combination with the additonal steps of:
   (1) receiving at said first location time multiplexed frames containing I field messages from said other device,
   (2) determining from a bit in each received I field message whether the message represents a data message or a control message,
   (3) applying signals contained in a received I field message to said data conductors at said first location when it is determined that said message is a data message, and
   (4) applying signals contained in a received I field message to said control conductors at said first location when it is determined that said message is a control message.

4. The method of claim 1 wherein said signals of a data message may represent synchronous or asynchronous data.

5. The method of claim 4 in combination with the additional steps of:
   (1) removing start and stop bits associated with each character of asynchronous data received over said data leads from said device at said first location prior to transmitting the data signals representing each character and
   (2) adding a start and stop bit to each character of asynchronous data in a received I field message before applying said character over said data leads to said data device.

6. A method of operating a data communication interface connected by data leads and control leads to a data device, said method comprising the steps of:
   (1) receiving data signals from said device over said data leads,
   (2) forming multifield data messages from said received data signals,
   (3) receiving control signals from said device over said control leads,
   (4) generating a multifield control message in response to the reception of each received control signal,
   (5) generating cyclically reoccurring time multiplexed frames each having a plurality of fields including an I (Information) field,
   (6) dividing each of said messages into a plurality of bytes and inserting each message byte into the I field of successive time multiplexed frames, and
   (7) transmitting said time multiplexed frames containing said message bytes over a communication path from said interface to another data device.

7. A method of operating a data communication interface connected by data leads and control leads to a data device at a first location, said method comprising the steps of:
   (1) receiving data signals from said device over said data leads,
   (2) forming a data message from said received data signals,
   (3) scanning said control leads to detect a change of state of the signals applied by said device to said control leads wherein each change of state represents the receipt of a control signal from said device,
   (4) generating a control message in response to each detected change of state,
   (5) generating cyclically reoccurring time multiplexed frames each having a plurality of fields including an I (Information) field,
   (6) dividing each of said messages into a plurality of bytes and inserting each byte of a message into the I field of one of said time multiplexed frames, and
   (7) transmitting said time multiplexed frames containing said message bytes over a communication path from said interface to another data device.

8. The method of claim 7 wherein:
   (1) said data messages contain said data signals plus protocol support fields and
   (2) said control messages include control signals and protocol support fields.

9. The method of claim 8 wherein said interface includes a microprocessor and wherein said method comprises the additional steps of:
   (1) applying said control lead signals to an input register for temporary storage of said control signals,
   (2) operating said microprocessor to generate said control message in response to each detected change of state,
   (3) applying said data messages through a first input of a multiplexor to an output path,
   (4) momentarily inhibiting said first input in response to the generation of a control message and applying said generated control message through a second input of said multiplexor to said output path, and (5) inserting said control and data messages received by said output path into the I field of successive ones of said cyclically reoccurring time multiplexed frames for transmission to said other data device.

10. The method of claim 9 in combination with the additional steps of:

(1) applying said transmitted frames to an interface serving said other data device having data and control leads, (2) applying signals contained in a transmitted data message to said data leads of said other device, and (3) applying signals contained in a transmitted control message to said control leads of said other device.

11. The method of claim 10 in combination with the additional steps of:

(1) receiving at said first location time multiplexed frames containing I field messages over said path from said other device, (2) determining from a bit in each received I field message whether the message represents a data message or a control message, (3) applying signals contained in a received I field message to said data conductors at said first location when it is determined that said message is a data message, and (4) applying signals contained in a received I field message to said control conductors at said first location when it is determined that said message is a control message.

12. The method of claim 11 wherein said data signals may represent synchronous or asynchronous data.

13. The method of claim 12 in combination with the additional steps of:

(1) removing start and stop bits associated with each character of ansynchronous data received over said data leads from said device at said first location prior to transmitting the data containing each character and (2) adding a start and stop bit to each character of asynchronous data in a received I field message before applying said character over said data leads to said data device.

14. A method of operating a data communication interface at a first location connected by data leads and control leads to a data device and connected by a communication path to a stored program controlled switching system, said method comprising the steps of:

(1) generating cyclically reoccurring time multiplexed frames each having a plurality of fields including an I (Information) field and an S (Signalling) field, (2) operating said interface in a first mode whereby signals received from said device on said data leads and said control leads are inserted as messages in the S field of consecutive time multiplexed frames for transmission over said communication path to a processor of said stored program communication system, (3) further operating said interface in said first mode whereby S field messages of time multiplexed frames are received at said first location from said switching system over said path and are controllably applied either to said control leads or to said data leads, (4) operating said interface in a second mode whereby signals received from said device on said data leads are inserted as data messages into said I field of said generated frames for transmission over said path and through said switching system to data leads of another data device, (5) further operating said interface in said second mode whereby signals received on said control leads from said device at said first location are formed into control messages for insertion into said I field of said generated frames for transmission over said path and through said switching system to control leads of said other device, and (6) further operating said interface in said second mode whereby the I fields of received time multiplexed frames containing data messages from said other device are applied to said data leads of said interface and whereby said I fields of said received frames containing control nessages are applied to said control leads of said interface.

15. A method of operating a data communication interface at a first location connected by data leads and control leads to a data device and connected by a communication path to a stored program controlled switching system, said method comprising the steps of:

(1) generating cyclically reoccurring time multiplexed frames each having a plurality of fields including an I (Information) field and an S (Signalling) field, (2) applying signals received by said interface from said device over said data and control leads to a microprocessor when said interface is operated in a first mode, (3) generating an S field message identifying said received signals in response to each reception of said signals by said microprocessor, (4) inserting each S field message, segment by segment, into the S fields of successive time multiplexed frames, (5) transmitting said time multiplexed frames over said communication path to said switching system, (6) extending each S field message received by said switching system to a system processor, (7) generating a data message in response to the signals received on said data leads when operating said interface in a second mode, (8) applying the signals received on said control leads to said microprocessor wherein each change of state of said signals represents the receipt of a control signal from said device, (9) generating a control message in response to each detected change of state when said interface is operated in said second mode, and

(10) inserting said control and data messages, byte by byte, into the I field of successive time multiplexed frames for transmission through said switching system to another data device.

16. The method of claim 15 wherein said method comprises the additional steps of:

(1) applying said control lead signals to an input register for temporary storage of said signals, (2) operating said microprocessor to generate said control message in response to each detected change of state, (3) applying said data messages through a first input of a multiplexor to an output path, (4) momentarily inhibiting said first input in response to the generation of a control message and applying said generated control message through a second input of said multiplexor to said output path, and (5) inserting said control and data messages received by said output path into the I field of successive ones of said cyclically reoccurring time multiplexed frames for transmission to said other data device.

17. The method of claim 16 in combination with the additional steps of:
    (1) applying said transmitted frames to an interface serving said other data device having data and control leads,
    (2) applying signals contained in a transmitted data message to said data leads of said other device, and
    (3) applying signals contained in a transmitted control message to said control leads of said other device.

18. The method of claim 17 in combination with the additional steps of:
    (1) receiving at said first location time multiplexed frames containing I field messages over said path from said other device,
    (2) determining from a bit in each received I field message whether the message represents a data message or a control message,
    (3) applying signals contained in a received I field message to said data conductors when it is determined that said message is a data message, and
    (4) applying signals contained in a received I field message to said control conductors when it is determined that said message is a control message.

19. The method of claim 18 wherein said data signals may represent synchronous or asynchronous data.

20. The method of claim 19 in combination with additional steps of:
    (1) removing the start and stop bits associated with each character of asynchronous data received over said data leads from said device prior to transmitting the data containing each character and
    (2) adding a start and stop bit to each character of asynchronous data in a received I field message before applying said character over said data leads to said data device.

21. A method for exchanging information between two data devices wherein each device is connected by data leads and control leads to an interface associated with each device and wherein the interfaces of the two devices are connected to each other by a communication path which transports data having a variety of bit rates and communication protocols, said method comprising the steps of:
    (1) generating cyclically reoccurring time multiplexed frames at each interface wherein each of said frames has a plurality of fields including an information field,
    (2) transmitting the frames generated at each interface over said path to the interface at the other end of said path,
    (3) operating said interface in a first manner wherein 64 Kbps data signals are received over said data leads by an interface,
    (4) segmenting said signals into data bytes,
    (5) inserting said data bytes into the I fields of successive ones of said frames for transmission over said path to said other interface,
    (6) applying the I field data bytes received by an interface to the data leads of its associated data device,
    (7) operating said interface in a second manner wherein 56 Kbps data signals are received over said data leads by an interface,
    (8) segmenting said received 56 Kbps data into 7 bit segments,
    (9) forming an 8 bit byte from each 7 bit segment by adding an indicator bit to each 7 bit segment to indicate whether the segment represents device data or device control information,
    (10) inserting said last named bytes into the I fields of successive ones of said frames for transmission over said path to the other interface,
    (11) decoding the indicator bit of each received 8 bit byte to determine whether the 7 bit segment in said received byte represents device data or device control information,
    (12) operating said interface in a third manner wherein data signals at a rate of up to 50 Kbps are received on said data leads and control signals are received on said control leads by an interface,
    (13) forming said received data and control signals into data and control messages, respectively,
    (14) inserting said formed messages, byte by byte, into the I field of successive ones of said frames for transmission over said path to said other interface,
    (15) applying the I field data messages received by an interface to the data leads of its associated interface, and
    (16) applying the I field control messages received by an interface to the control leads of its associated interface.

22. The method of claim 21 wherein said data bytes and said messages are transmitted with protocol support information over said path.

23. In a data communication interface at a first location connected by data leads and control leads to a data device,
    means for receiving data signals from said device over said data leads and control signals over said control leads,
    means for forming a multifield data message from said received data signals,
    means for forming a multifield control message from said received control signals,
    means for generating cyclically reoccurring time multiplexed frames each having a plurality of fields including an I (Information) field,
    means for dividing each of said messages into a plurality of bytes and inserting each byte of a message into the I field of one of said time multiplexed frames, and
    means for transmitting said time multiplexed frames containing said inserted message bytes over said communication path from said interface to another data device.

24. The interface of claim 23 in combination with:
    means for applying said transmitted frames to an interface at a second location serving a data device having data and control leads,
    means for applying signals contained in a transmitted data message to said data leads of said other device, and
    means for applying signals contained in a transmitted control message to said control leads of said other device.

25. The method of claim 24 in combination with:
means at said first location for receiving time multiplexed frames containing I field messages from said other device, means for determining from a bit in each received I field message whether the message represents a data message or a control message, means for applying signals contained in a received I field message to said data conductors when it is determined that said message is a data message, and means for applying signals in a received I field message to said control conductor when it is determined that said message is a control message.

26. The interface of claim 25 wherein said signals of a data message may represent synchronous or asynchronous data.

27. The interface of claim 26 in combination with:

means for removing start and stop bits associated with each character of asynchronous data received at a first location over said data leads from said device prior to transmitting the data signals representing each character and means for adding a start and stop bit to each character of asynchronous data in a received I field message before applying said character over said data leads to said data device.

28. In a data communication interface at a first location connected by data leads and control leads to a data device;

means for receiving data signals from said device over said data leads, means for forming multifield data messages from said received data signals, means for receiving control signals from said device over said control leads, means for generating a multifield control message in response to the reception of each received control signal, means for generating cyclically reoccurring time multiplexed frames each having a plurality of fields including an I (Information) field, means for dividing each of said messages into a plurality of bytes and inserting each of said message bytes into the I field of one of said time multiplexed frames, and means for transmitting said time multiplexed frames containing said message bytes over a communication path from said interface to another device.

29. In a data communication interface at a first location connected by data leads and control leads to a data device;

means for receiving data signals from said device over said data leads, means for forming a data message from said received data signals, means for scanning said control leads to detect a change of state of the signals applied by said device to said control leads wherein each change of state represents the receipt of a control signal from said device, means for generating a control message in response to each detected change of state, means for generating cyclically reoccurring time multiplexed frames each having a plurality of fields including an I (Information) field, means for dividing each of said messages into a plurality of bytes and for inserting each byte of a message into the I field of one of said time multiplexed frames, and means for transmitting said time multiplexed frames containing said messages bytes over a communication path from said interface to another data device.

30. The interface of claim 29 wherein:

said data messages contain data signals plus protocol support fields and said control messages include protocol support fields.

31. The interface of claim 30 in which said interface includes a microprocessor and:

means for applying said control lead signals to an input register for temporary storage of said control signals, means for operating said microprocessor to generate said control message in response to each detected change of state, means for applying data messages through a first input of a multiplexor to an output path, means for momentarily inhibiting said first input and applying said control message through a second input of said multiplexor to said output path, and means for inserting said control and data messages received by said output path into the I field of said cyclically reoccurring time multiplexed frames for transmission to said other data device.

32. The interface of claim 31 in combination with:

means for applying said transmitted frames to an interface serving said other data device having data and control leads, means for applying signals contained in a transmitted data message to said data leads of said other device, and means for applying signals contained in a transmitted control message to said control leads of said other device.

33. The interface of claim 32 in combination with:

means at said first location for receiving time multiplexed frames containing I field messages over said path from said other device, means for determining from a bit in each received I field message whether the message represents a data message or a control message, means for applying signals contained in a received I field message to said data conductors at said first location when it is determined that said message is a data message, and means for applying signals contained in a received I field message to said control conductors at said first location when it is determined that said message is a control message.

34. The interface of claim 33 wherein said data signals may represent synchronous or asynchronous data.

35. The method of claim 34 in combination with:

means for removing start and stop bits associated with each character of asynchronous data received at said first location over said data leads from said device prior to transmitting the data containing each character and means for adding a start and stop bit to each character of asynchronous data in a received I field message before applying said character over said data leads to said data device.

36. In a data communication interface at a first location connected by data leads and control leads to a data device and connected by a communication path to a stored program controlled switching system:

means for generating cyclically reoccurring time multiplexed frames each having a plurality of fields including an I (Information) field and an S (Signalling) field, means for operating said interface in a first mode whereby signals received from said device on said data leads and said control leads are inserted as messages in the S field of consecutive time multiplexed frames for transmission over said communication path to a processor of said stored program communication system, means for further operating said interface in said first mode whereby S field messages of time multiplexed frames are received at said first location from said switching system over said path and are controllably applied either to said control leads or to said data leads, means for operating said interface in a second mode whereby signals received from said device on said data leads are inserted as data messages into said I field of said generated frames for transmission over said path and through said switching system to data leads of another data device, means for further operating said interface in said second mode whereby signals received on said control leads from said device at said first location are formed into control messages for insertion into said I field of said generated frames for transmission over said path and through said switching system to control leads of said other device, and means for further operating said interface in said second mode whereby the I fields of received time multiplexed frames containing data messages from said other device are applied to said data leads of said interface and whereby said I fields of said received frames containing control messages are applied to said control leads of said interface.

37. In a data communication interface at a first location connected by data leads and control leads to a data device and connected by a communication path to a stored program controlled switching system:

means for generating cyclically reoccurring time multiplexed frames each having a plurality of fields including an I (Information) field and an S (Signalling) field, means for applying signals received by said interface from said device over said data and control leads to a microprocessor when said interface is operated in a first mode, means for generating an S field message, identifying said received signals in response to each reception of said signals by said microprocessor, means for inserting each S field message, segment by segment, into the S fields of successive time multiplexed frames, means for transmitting said time multiplexed frames over said communication path to said switching system, means for extending each S field message received by said switching system to a system processor, means for generating a data message in response to the signals received on said data leads when operating said interface in a second mode, means for applying the signals received on said control leads to said microprocessor wherein each change of state of said signals represents the receipt of a control signal from said device, means for generating a control message in response to each detected change of state when said interface is operated in said second mode, and means for inserting said control and data messages, byte by byte, into the I field of successive time multiplexed frames for transmission through said switching system to another data device.

38. The interface of claim 37 in combination with:

means for applying said control lead signals to an input register for temporary storage of said signals, means for operating said microprocessor to generate said control message in response to each detected change of state, means for applying said data messages through a first input of a multiplexor to an output path, means for momentarily inhibiting said first input in response to the generation of a control message and applying said generated control message through a second input of said multiplexor to said output path, and means for inserting said control and data messages received by said output path into the I field of successive ones of said cyclically reoccurring time multiplexed frames for transmission to said other data device.

39. The interface of claim 38 in combination with:

means for applying said transmitted frames to an interface serving said other data device having data and control leads, means for applying signals contained in a transmitted data message to said data leads of said other device, and means for applying signals contained in a transmitted control message to said control leads of said other device.

40. The interface of claim 39 in combination with:

means at said first location for receiving time multiplexed frames contained I field messages over said path from said other device, means for determining from a bit in each received I field message whether the message represents a data message or a control message, means for applying signals contained in a received I field message to said data conductors when it is determined that said message is a data message, and means for applying signals contained in a received I field message to said control conductors when it is determined that said message is a control message.

41. The interface of claim 40 wherein said data signals may represent synchronous or asynchronous data.

42. The method of claim 41 in combination with:

means for removing the start and stop bits associated with each character of asynchronous data received over said data leads from said device prior to transmitting the data containing each character and means for adding a start and stop bit to each character of asynchronous data in a received I field message before applying said character over said data leads to said data device.

43. In a system for exchanging information between two data devices wherein each device is connected by data leads and control leads to an interface associated with each device and wherein the interfaces of the two devices are connected to each other by a communication path which transports data having a variety of bit rates and communication protocols, said interfaces each comprising:

means for generating cyclically reoccurring time multiplexed frames at each interface wherein each one of said frames has a plurality of fields including an information field, means for transmitting the frames generated at each interface over said path to the interface at the other end of said path, means for operating said interface in a first manner wherein 64 Kbps data signals are received over said data leads by an interface, means for segmenting said data signals into data bytes, means for inserting said data bytes into the I fields of successive ones of said frames for transmission over said path to said other interface, means for operating said interface in a second manner wherein 56 Kbps data signals are received over said data leads by an interface, means for segmenting said received 56 Kbps data into 7 bit segments, means for forming an 8 bit byte from each 7 bit segment by adding an indicator bit to each 7 bit segment to indicate whether the segment represents device data or device control information, means for inserting said last named bytes into the I fields of successive ones of said frames for transmission over said path to the other interface, means for decoding the indicator bit of each received 8 bit byte to determine whether the 7 bit segment in said received byte represents device data or device control information, means for operating said interface in a third manner wherein data signals at a rate of up to 50 Kbps are received on said data leads and control signals are received on said control leads by an interface, means for forming said received data and control signals into data and control messages, respectively, means for inserting said last named formed messages, byte by byte, into the I field of successive ones of said frames for transmission over said path to said other interface, means for applying the I field data messages received by an interface to the data leads of its associated interface, and means for applying the I field control messages received by an interface to the control leads of its associated interface.

44. The system of claim 43 wherein said data bytes and said messages are transmitted with protocol support information over said path.

45. A method of operating a data communication interface connected by data leads and control leads to a data device, said method comprising the steps of:
 (1) receiving signals from said data device over said leads,
 (2) forming data messages from said received signals,
 (3) generating cyclically reoccurring time multiplexed frames each having a plurality of fields including an I (Information) field,
 (4) dividing each of said messages into a plurality of bytes and inserting each byte of a message into the I field of one of said tine multiplexed frames, and
 (5) applying said time multiplexed frames containing said inserted message bytes to a communication path for transmission from said interface to another data device.

46. The method of claim 45 wherein said formed messages comprise a plurality of fields including protocol support fields whcih are transmitted in successive ones of said time multiplexed frames.

47. The method of claim 46 in combination with the additional steps of:
 (1) applying said transmitted frames to an interface serving a device having data and control leads and
 (2) applying said signals contained in a transmitted message to said leads of said last named device.

* * * * *